(12) United States Patent
Schnaibel et al.

(10) Patent No.: US 6,862,880 B2
(45) Date of Patent: Mar. 8, 2005

(54) METHOD FOR OPERATING A CATALYST

(75) Inventors: Eberhard Schnaibel, Hemmingen (DE); Andreas Blumenstock, Ludwigsburg (DE); Klaus Winkler, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/333,659

(22) PCT Filed: May 29, 2001

(86) PCT No.: PCT/DE01/02036

§ 371 (c)(1),
(2), (4) Date: Aug. 19, 2003

(87) PCT Pub. No.: WO02/08594

PCT Pub. Date: Jan. 31, 2002

(65) Prior Publication Data

US 2004/0016229 A1 Jan. 29, 2004

(30) Foreign Application Priority Data

Jul. 21, 2000 (DE) ........................ 100 35 525

(51) Int. Cl.[7] .............................................. F01N 3/00
(52) U.S. Cl. ............................. 60/295; 60/274; 60/276; 60/285; 60/301
(58) Field of Search .......................... 60/274, 276, 277, 60/295, 301

(56) References Cited

U.S. PATENT DOCUMENTS

| | | | | |
|---|---|---|---|---|
| 5,564,405 A | | 10/1996 | Moll | |
| 5,724,808 A | * | 3/1998 | Ito et al. ........................ | 60/276 |
| 5,771,685 A | * | 6/1998 | Hepburn ....................... | 60/274 |
| 5,974,788 A | * | 11/1999 | Hepburn et al. ............... | 60/274 |
| 6,164,064 A | * | 12/2000 | Pott ............................. | 60/277 |
| 6,171,565 B1 | * | 1/2001 | Hohne et al. ............. | 423/239.1 |
| 6,301,878 B1 | | 10/2001 | Zhang et al. | |
| 6,324,834 B1 | * | 12/2001 | Schnaibel et al. ............. | 60/274 |
| 6,408,615 B1 | | 6/2002 | Hahn | |
| 6,588,251 B2 | | 7/2003 | Zhang et al. | |
| 6,637,190 B1 | * | 10/2003 | Pott ............................. | 60/274 |

FOREIGN PATENT DOCUMENTS

| | | |
|---|---|---|
| DE | 24 44 334 | 3/1976 |
| DE | 198 23 921 | 2/1999 |
| DE | 198 01 625 | 7/1999 |
| DE | 198 44 082 | 10/1999 |
| EP | 0 560 991 | 9/1993 |
| JP | 08 232644 | 9/1996 |

OTHER PUBLICATIONS

Patent Abstracts of Japan, vol. 1997, No. 01, Jan. 31, 1997.

* cited by examiner

*Primary Examiner*—Thomas Denion
*Assistant Examiner*—Diem Tran
(74) *Attorney, Agent, or Firm*—Kenyon & Kenyon

(57) ABSTRACT

A method for operating a catalytic converter arranged in the exhaust gas of an internal combustion engine. The composition of exhaust gas being controlled in front of the catalytic converter by adding a reducing agent that promotes the regeneration of the catalytic converter. The composition of the exhaust gas being detected with the aid of an exhaust-gas sensor positioned downstream from the catalytic converter. A time lag between the start of controlling the composition of the exhaust gas in front of the catalytic converter and the detection of a change in the composition after the catalytic converter are evaluated. In order to be able to determine the end of a regeneration phase of the catalytic converter in a safe and reliable manner, the gradient of an output signal of the exhaust-gas sensor is evaluated.

10 Claims, 2 Drawing Sheets

METHOD FOR OPERATING A CATALYST

FIELD OF THE INVENTION

The present invention relates to a method for operating a catalytic converter positioned in the exhaust gas of an internal combustion engine.

In this context, the composition of the exhaust gas is controlled in front of the catalytic converter, by adding reducing agent that promotes the regeneration of the catalyst. The composition of the exhaust gas is measured with the aid of an exhaust-gas sensor positioned downstream from the catalytic converter. A time delay between the start of the exhaust-composition control in front of the catalytic converter and the detection of a change in the composition after the catalytic converter is evaluated.

In addition, the present invention relates to a control unit for an internal combustion engine including a catalytic converter that is positioned in the exhaust gas of the engine. The control unit controls the composition of the exhaust gas in front of the catalytic converter by adding reducing agent that promotes the regeneration of the catalyst. The control unit evaluates the time delay between the start of the exhaust-composition control in front of the catalytic converter and the detection by an exhaust-gas sensor of a change in the composition after the catalytic converter.

Furthermore, the present invention relates to a control element, e.g., a read-only memory or a flash memory, for such a control unit.

Finally, the present invention relates to an internal combustion engine including a catalytic converter positioned in the exhaust gas of the engine. The engine includes a control unit and an exhaust-gas sensor positioned downstream from the catalytic converter. The control unit controls the composition of the exhaust gas in front of the catalytic converter by adding reducing agent that promotes the regeneration of the catalytic converter. The exhaust-gas sensor measures the composition of the exhaust gas after the catalytic converter. The control unit evaluates a time delay between the start of controlling the composition of the exhaust gas in front of the catalytic converter and the detection of a change in the composition after the catalytic converter.

BACKGROUND INFORMATION

In the operating range of an internal combustion engine, a conventional three-way catalytic converter may no longer fulfill the requirements for nitrogen-oxide conversion when the fuel-air mixture is lean (lambda>1). NOx storage catalysts, which store nitrogen oxides emitted during lean-combustion operation, are used in this case. Stored nitrates are released and reduced to nitrogen by operating the engine in a rich range (lambda<1). The use of an NOx storage catalyst in this context is discussed, for example, in European Patent No. 0 560 991.

Legislative requirements provide for an on-board diagnosis of motor-vehicle components relevant to pollutant emissions, such as catalytic converters. In this connection, it is discussed, e.g., in German Published Patent Application No. 24 44 334 that one may use the output signals of an oxygen-sensitive exhaust-gas analyzer probe positioned in front of the catalyst and one positioned behind the catalyst to assess a three-way catalytic converter. The conventional method is based on the capability of a functioning three-way catalytic converter to store oxygen. In this context, German Published Patent Application No. 24 44 334 discusses the changing of the fuel-air mixture composition from lambda=0.95 (rich, fuel-rich mixture; oxygen deficiency) to lambda=1.05 (lean, fuel-poor mixture; excess oxygen). The exhaust-gas sensor arranged in front of the catalytic converter reacts to the change in the fuel-air mixture composition with almost no delay. Due to the prevailing oxygen deficiency in the exhaust gas at lambda=0.95, the oxygen storage locations of the catalyst are initially not occupied. After the switchover to lean-combustion operation (excess oxygen) in front of the catalyst, the oxygen storage locations are successively occupied. Therefore, after the composition of the mixture is changed, the oxygen deficiency initially continues in back of the catalyst. After a period of time dependent on the oxygen storage capability of the catalyst, an excess of oxygen also occurs behind the catalyst, triggering a change in the signal of the rear exhaust-gas sensor. The time delay, i.e. the phase shift between the reactions of the two exhaust-gas sensors, decreases with decreasing oxygen storage capability of the catalyst and may therefore be used to assess the oxygen storage capability for diagnosing the catalyst.

This conventional method may not be easily applied to a catalytic converter, which, in addition to being capable of storing oxygen, is also capable of storing nitrogen oxides (NOx). Such catalytic converters may normally store nitrogen oxides as well, when their oxygen storage capability is already exhausted, and an exhaust-gas sensor arranged behind the catalytic converter indicates an excess of oxygen. In the case of NOx storage catalysts, the time delay between the reactions of the two exhaust-gas sensors after the mixture composition is changed from a rich to a lean mixture therefore does not supply any information about their NOx storage capability.

Internal combustion engines having direct gasoline injection may provide reduced carbon dioxide ($CO_2$) emissions. Since these engines are predominantly operated with a lean fuel-air mixture, they are provided with a nitrogen-oxide (NOx) storage catalytic converter, which stores NOx emissions formed in the lean mixture phase, and is freed from the stored nitrogen oxides by operating the engine with a rich mixture. Since engines having direct gasoline injection are also operated at lambda=1, the NOx storage catalytic converters are, generally, also capable of storing oxygen. A conventional three-way catalyst may be used, for example, to store oxygen.

Since the capability of a catalytic converter to store nitrogen oxides is limited, the catalyst is regenerated from time to time. The times for beginning and ending the regeneration are important with regard to the emissions discharged in back of the catalyst into the environment. During lean operation of an internal combustion engine, the NOx storage catalyst is filled with nitrogen oxides and the three-way catalyst is filled with oxygen. The beginning of the regeneration phase is stipulated by an NOx storage model. This models the amount of nitrogen oxides introduced into the NOx storage catalyst and therefore models its NOx level. If the modeled variable exceeds a specifiable threshold, then a regeneration phase (operation of the internal combustion engine with a rich mixture) is initiated.

It has been shown that, when the engine is operated with a rich mixture, the NOx storage catalyst is initially emptied before the oxygen reservoir is completely emptied. When regeneration is performed so long that the oxygen reservoir is completely emptied, then this creates high hydrocarbon (HC) emissions, since the rich mixture is no longer buffered by the oxygen reservoir. For this reason, it is important to just regenerate the catalytic converter long enough to empty the NOx storage device, but the oxygen reservoir should not yet be emptied. This constitutes regeneration that is optimal with respect to hydrocarbons.

German Published Patent Application No. 198 01 625 discusses that the regeneration phase may be ended when an output signal, e.g., an output voltage, of the exhaust-gas sensor arranged behind the catalytic converter exceeds a specifiable threshold value. It is then assumed that the NOx store is completely emptied but the oxygen store is not completely emptied. However, this conventional method provides that the output signal of the exhaust-gas sensor is subject to certain fluctuations and may therefore exceed the predetermined threshold value at various times. The fluctuations of the output signal are caused by manufacturing tolerances and temperature fluctuations of the exhaust-gas sensor.

It is an object of the present invention to be able to detect the end of a regeneration phase of the catalytic converter as safely and reliably as possible.

In order to achieve this object, the method according to the present invention involves evaluating the gradient of an output signal of the exhaust-gas sensor.

SUMMARY OF THE INVENTION

Therefore, according to the present invention, the exceeding of a threshold value by the output signal of the exhaust-gas sensor is not used as a criterion for the end of the regeneration phase, but rather the slope of the output signal. This may allow the end of the regeneration phase to be determined in a considerably safer and more reliable manner, and above all, independently of manufacturing tolerances and temperature fluctuations of the exhaust-gas sensor. The method of the present invention may ensure that the engine always operates with especially low emissions.

The method of the present invention may be used with conventional three-way catalytic converters in the same manner as with modern NOx-storage catalytic converters that are or are not capable of storing oxygen. In the case of three-way catalytic converters, the method of the present invention may allow the emptied oxygen reservoir to be detected by evaluating a characteristic change in the gradient of the output signal of the exhaust-gas sensor. In the case of an NOx storage catalyst, the end of the NOx regeneration phase may be determined. If the NOx storage catalyst is also capable of storing oxygen, then the end of the oxygen-reservoir regeneration phase may also be determined.

An example embodiment of the present invention involves that a catalyst capable of storing nitrogen oxides be judged to be regenerated, when the gradient of the output signal of the exhaust-gas sensor exceeds a specifiable, first limiting value. Reducing agent is added to the exhaust gas at the beginning of the regeneration phase. To this end, the internal combustion engine may be operated with a rich fuel-air mixture (lambda≦1). The rich mixture setting causes excess hydrocarbons (HC) and carbon monoxide (CO) to be formed in the exhaust gas in front of the catalyst. The following processes occur when the mixture setting is rich: the hydrocarbons and the carbon monoxide reduce the stored nitrogen oxides. The oxygen stored and chemically bound in the form of nitrogen oxides is released together with the rest of the oxygen stored in the catalyst, so that the excess of oxygen behind the catalytic converter is initially maintained. Therefore, the output signal of the exhaust-gas sensor arranged in back of the catalyst also initially remains at a level corresponding to an excess of oxygen. However, as soon as the nitrogen oxides stored in the catalyst are regenerated, the oxygen concentration in the exhaust gas behind the catalyst decreases, and the output signal of the exhaust-gas sensor increases accordingly. When the slope of the output signal has reached a certain slope, i.e. when the gradient of the output signal has exceeded the first limiting value, the catalytic converter is judged to be regenerated.

As alternative example embodiment of the present invention involves that a catalyst capable of storing nitrogen oxides be judged to be regenerated, when the gradient of the output signal of the exhaust-gas sensor initially exceeds a specifiable, first limiting value and then falls below a specifiable, second limiting value. The output signal of the exhaust-gas sensor arranged behind the catalyst increases relatively abruptly towards the end of the nitrogen-oxide regeneration phase, in order to then remain at a relatively constant level during the oxygen regeneration phase. Therefore, this alternative example embodiment provides for the sharp increase in the output signal (the gradient of the output signal exceeds the first limiting value) being initially ascertained, and the transition to the constant level (the gradient of the output signal falls below the second limiting value) then being ascertained.

Another example embodiment of the present invention involves that a catalytic converter capable of storing nitrogen oxides be judged to be regenerated, when the gradient of the output signal of the exhaust-gas sensor exceeds a specifiable, third limiting value. Towards the end of the oxygen regeneration phase, the output signal of the exhaust-gas sensor arranged in back of the catalyst again increases relatively abruptly from the constant level. The reason for this is the oxygen deficiency in back of the catalyst towards the end of the oxygen regeneration phase. This relatively sharp increase of the output signal (the gradient of the output signal exceeds the third limiting value) is ascertained and judged to be an indication of the end of the oxygen regeneration phase.

If, in addition to being capable of storing oxygen, the catalytic converter is also capable of storing nitrogen oxides, the end of the nitrogen-oxide regeneration phase may initially be ascertained, and the end of the oxygen regeneration phase may then be ascertained, by evaluating the gradient of the output signal. When the catalytic converter is only capable of storing oxygen, the diagnosis of the nitrogen-oxide regeneration phase is eliminated. However, the method of the present invention also offers crucial advantages in the case in which only oxygen is stored, since evaluation of the output-signal gradient may allow the end of the oxygen regeneration phase to be detected in a considerably safer and more reliable manner.

An alternative example embodiment of the present invention involves that a catalytic converter capable of storing oxygen be judged to be regenerated, when the gradient of the output signal of the exhaust-gas sensor initially exceeds a specifiable, third limiting value and then falls below a specifiable, fourth limiting value. The output signal of the exhaust-gas sensor arranged behind the catalyst increases relatively abruptly towards the end of the oxygen regeneration phase, in order to then decrease relatively abruptly after reaching a maximum. This transition from the relatively abrupt increase (the gradient of the output signal exceeds the third limiting value) to the maximum is detected in accordance with this alternative example embodiment. The slope of the output signal decreases during the transition to the maximum. When the slope of the output signal falls below the fourth limiting value, this is judged to be an indication of the end of the oxygen regeneration phase.

The reducing agent may be added to the exhaust gas in different manners. An example embodiment of the present invention involves that the internal combustion engine may be operated with a rich fuel-air mixture for the addition of reducing agent to the exhaust gas. Hydrocarbons (HC) and/or carbon monoxide (CO) are added to the exhaust gas as reducing agents.

An alternative example embodiment of the present invention involves that urea be added to the exhaust gas as a reducing agent. In this context, ammonia from the urea is used to reduce the nitrogen oxide to oxygen and nitrogen. The ammonia may be recovered from a urea solution by hydrolysis.

It is important to implement the method of the present invention in the form of a control element, which is provided for a control unit of an internal combustion engine of, e.g., a motor vehicle. A program capable of running on a computer, e.g., on a microprocessor, and suitable for execution of the method according to the present invention is stored on the control element. In this case, the present invention is therefore implemented by a program stored on this control element, so that this control element equipped with the program constitutes (represents) the present invention in the same manner as the method for whose execution the program is suitable. An electric storage medium, such as a read-only memory or a flash memory, may be used as the control element.

In order to achieve the object of the present invention, the control unit includes an arrangement for evaluating the gradient of an output signal of the exhaust-gas sensor.

Finally, in order to achieve the object of the present invention, the internal combustion engine includes an arrangement for evaluating the gradient of an output signal of the exhaust-gas sensor.

An example embodiment of the present invention involves that the exhaust-gas sensor take the form of an oxygen-sensitive sensor. Such an exhaust-gas sensor measures the concentration of oxygen contained in the exhaust gas and outputs a corresponding output voltage as an output signal. An example of such a sensor is a lambda sensor known from other systems. The exhaust-gas sensor takes the form of a two-point sensor.

An example embodiment of the present invention involves that the catalytic converter be capable of storing oxygen. An example of such a catalytic converter is a conventional three-way catalytic converter, which is known from other systems. In addition, as an alternative to or in addition to being capable of storing oxygen the catalytic converter may be capable of storing nitrogen oxides.

DETAILED DESCRIPTION

Figure 1:
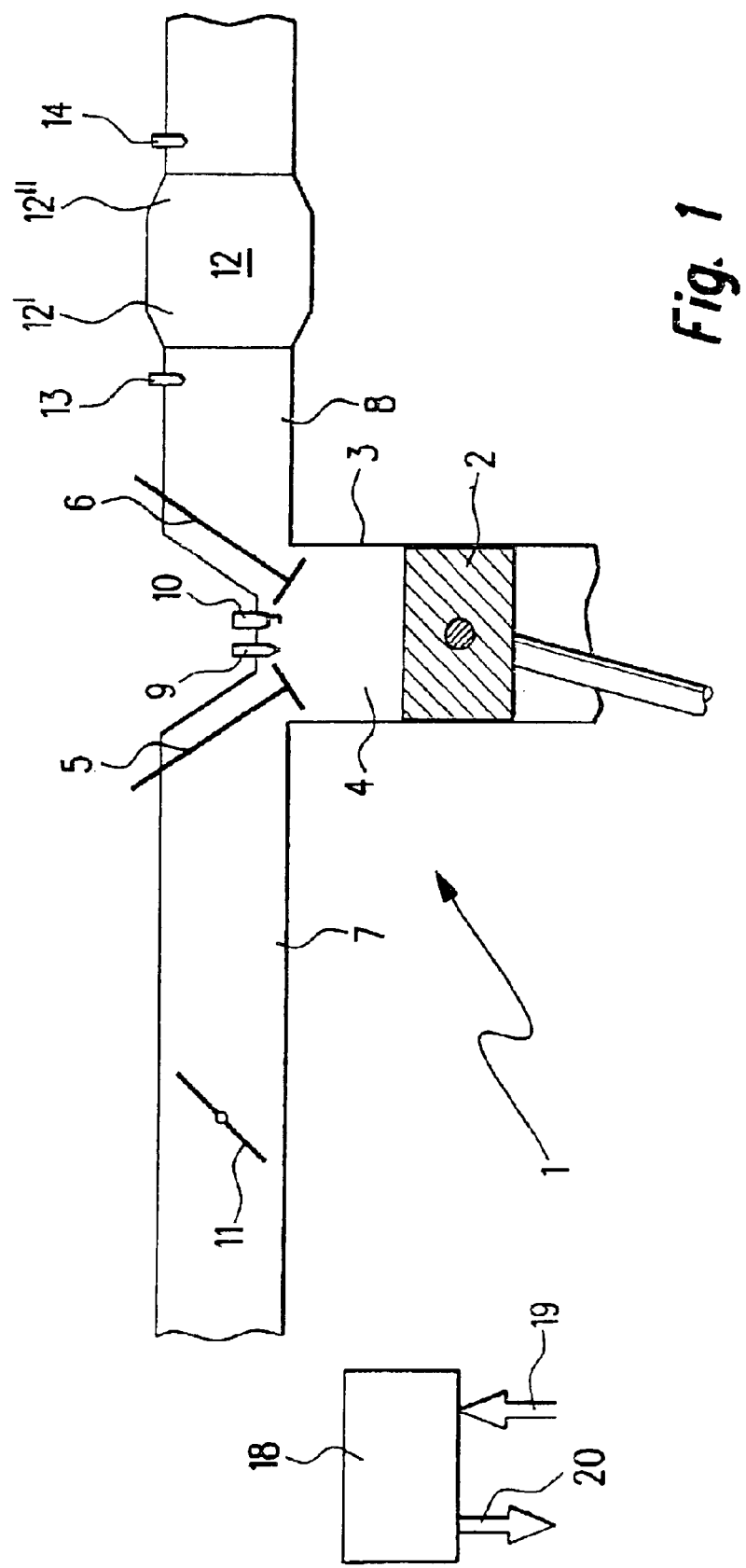
FIG. 1 shows a schematic block diagram of an example embodiment of an internal combustion engine according to the present invention.

Represented in FIG. 1 is a direct-injection internal combustion engine 1 of a motor vehicle, in which a piston 2 may be moved back and forth in a cylinder 3. Cylinder 3 is provided with a combustion chamber 4, which is delimited by, inter alia, piston 2, an intake valve 5, and an exhaust valve 6. An intake manifold 7 is connected to intake valve 5, and an exhaust pipe 8 is connected to exhaust valve 9.

A fuel injector 9 and a spark plug 10 extend into combustion chamber 4 in the region of intake valve 5 and exhaust valve 6. Fuel may be injected through injector 9 into combustion chamber 4. The fuel in combustion chamber 4 may be ignited by spark plug 10.

A rotatable throttle valve 11 through which air may be supplied to intake manifold 7 is accommodated in intake manifold 7. The amount of air supplied depends on the angular position of throttle valve 11. A catalytic converter 12, which purifies the exhaust gases formed by the combustion of the fuel, is accommodated in exhaust pipe 8. Catalytic converter 12 is a nitrogen-oxide (NOx) storage catalyst 12', which is coupled to a three-way catalyst 12" used as an oxygen reservoir.

A control unit 18 receives input signals 19, which represent performance quantities of internal combustion engine 1 measured by sensors. Control unit 18 generates output signals 20, by which the performance of internal combustion engine 1 may be influenced via actuators. Control unit 18 is provided for, inter alia, controlling and/or regulating the performance quantities of internal combustion engine 1. To this end, control unit 18 is equipped with a microprocessor, which includes a program suitable for execution of this control and/or regulation stored in a storage medium, e.g., in a flash memory.

In a first mode of operation, so-called homogeneous operation of internal combustion engine 1, throttle valve 11 is partially opened or closed as a function of the desired torque. During an intake phase brought about by piston 2, the fuel is injected into combustion chamber 4 by injector 9. Turbulence is created in the injected fuel due to the simultaneous air intake through throttle valve 11, and the fuel is therefore distributed in combustion chamber 4 in an uniform manner. The fuel-air mixture is then compressed during the compression phase, in order to then be ignited by spark plug 10. The expansion of the ignited fuel drives piston 2. During homogeneous operation, the resulting torque is a function of, inter alia, the position of throttle valve 11. From the standpoint of low emissions, the fuel-air mixture is set as closely as possible to lambda=1.

In a second mode of operation, so-called stratified-charge operation of internal combustion engine 1, throttle valve 11 is opened wide. Fuel is injected into combustion chamber 4 by injector 9 during a compression phase produced by piston 2, namely locally into the immediate vicinity of spark plug 10 and chronologically at a suitable interval prior to the ignition time. The fuel is then ignited with the aid of spark plug 10, so that, in the subsequent working phase, piston 2 is driven by the expansion of the ignited fuel. In stratified-charge operation, the resulting torque is largely a function of the mass of fuel injected. Stratified charge operation is provided for idling operation and partial load operation of internal combustion engine 1. In stratified-charge operation, lambda is normally>1.

During stratified-charge operation, storage catalyst 12' is loaded with nitrogen oxides, and three-way catalyst 12" is loaded with oxygen. In a regeneration phase, storage catalyst 12' and three-way catalyst 12" are regenerated, so that they may again receive nitrogen oxides or oxygen in a subsequent stratified-charge operation. During the regeneration phase, a reducing agent is introduced into the exhaust gas in front of catalytic converter 12. For example, hydrocarbons (HC), carbon monoxide (CO), or urea may be used as a reducing agent. Hydrocarbons and carbon monoxide are generated in the exhaust gas by a rich mixture setting (operation of the engine in homogeneous operation). Urea may be dosed (metered) to the exhaust gas from a supply tank. The following processes occur during the regeneration phase of catalytic converter 12: The reducing agent reduces the stored nitrogen oxides to nitrogen and oxygen. These substances exit catalytic converter 12, so that an excess of oxygen is produced behind catalytic converter 12 during the regeneration phase.

In exhaust pipe 8, a first exhaust-gas sensor 13 is arranged in front of catalytic converter 12, and a second exhaust-gas sensor 14 is arranged after catalytic converter 12. A conventional, oxygen-sensitive lambda probe or a hydrocarbon sensor may be used as an exhaust-gas sensor 14 arranged in back of catalytic converter 12. Rear exhaust-gas sensor 14 may take the form of a two-point sensor.

After the switchover to a deficiency of oxygen (operation of internal combustion engine 1 with a rich mixture) in front of catalytic converter 12, the exhaust-gas sensor 13 arranged in front of catalytic converter 12 reacts with practically no delay at the start of the regeneration phase. Due to the excess of oxygen prevailing in the exhaust gas during stratified-charge operation, almost all of the oxygen storage locations of catalytic converter 12 are initially occupied. After the switchover to an oxygen deficiency in front of catalytic converter 12 at the start of the regeneration phase, the oxygen storage locations are successively freed of oxygen, and the oxygen exits catalytic converter 12. Therefore, an excess of oxygen initially continues to prevail in back of catalytic converter 12 after the switchover to the regeneration phase. After a time lag dependent on the oxygen storage capability of catalytic converter 12, an oxygen deficiency also occurs behind the catalytic converter, causing a change in the output signal of rear exhaust-gas sensor 14.

In back of catalytic converter 12, an oxygen deficiency only occurs when both the nitrogen-oxide storage locations in nitrogen-oxide storage catalyst 12' and the oxygen storage locations in the three-way catalyst are empty. If, for example, catalytic converter 12 is initially filled with oxygen and nitrogen oxides by operating internal combustion engine 1 with a lean mixture (lambda>1), and, in order to regenerate catalytic converter 12, hydrocarbons and carbon monoxide are then produced in the exhaust gas by a rich mixture setting (lambda<1), then the following processes occur: The hydrocarbons and the carbon monoxide reduce the stored nitrogen oxides to nitrogen and oxygen. The oxygen stored and bound in the form of nitrogen oxides is released together with the rest of the oxygen stored in catalytic converter 12, so that the excess of oxygen behind catalytic converter 12 is initially maintained.

Figure 2:
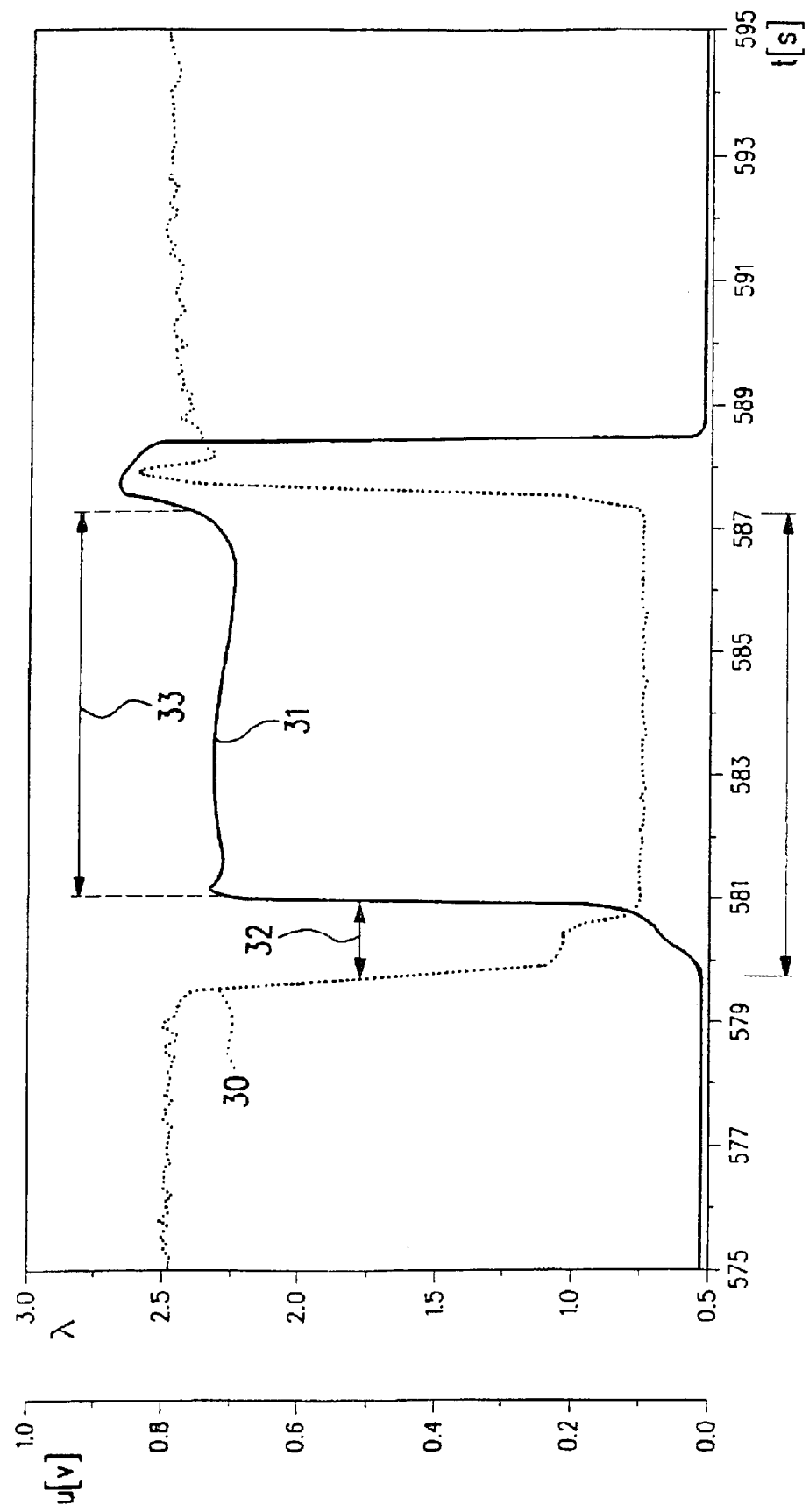
FIG. 2 shows the curves of various signals during the execution of the method according to present invention.

In FIG. 2, the composition of the fuel-air mixture in front of catalytic converter 12 is illustrated by the curve of the corresponding lambda value 30 in front of catalytic converter 12. The curve of output signal U of rear exhaust-gas sensor 14 is also represented in FIG. 2 and indicated by reference numeral 31. At the beginning of the signal characteristic represented in FIG. 2, internal combustion engine 1 is operated with a lean mixture composition (lambda~2.5). As already described above, an excess of oxygen prevails in back of catalytic converter 12 in this case. Output signal 31 of rear exhaust-gas sensor 14 is approximately 0 Volts. The concentration of fuel in the fuel-air mixture is increased at approximately time t=579 sec, and internal combustion engine 1 is operated with a rich mixture. Lambda value 30 in front of catalytic converter 12 decreases to a value of approximately 0.75. Output signal 31 of rear exhaust-gas sensor 14 initially remains at a low value.

The oxygen concentration in the exhaust gas behind catalytic converter 12 only decreases after the nitrogen oxides stored in nitrogen-oxide storage catalyst 12' are reduced to nitrogen, i.e. when the regeneration phase of nitrogen-oxide storage catalyst 12' has ended. This results in a clearly visible increase in output signal 31 of exhaust-gas sensor 14 from approximately 0 Volts to an constant level of approximately 0.7 Volts. The regeneration phase of nitrogen-oxide storage catalyst 12' is designated in FIG. 2 by reference numeral 32.

According to the present invention, one may infer that regeneration phase 32 of nitrogen-oxide storage catalyst 12' has ended, when the gradient of output signal 31 of exhaust-gas sensor 14 exceeds a specifiable limiting value, i.e. when the slope of output signal 31 has reached a particular value. Alternatively, one may deduce that regeneration phase 32 has ended, when the gradient of output signal 31 of exhaust-gas sensor 14 initially exceeds a specifiable, first limiting value and then falls below a specifiable, second limiting value, i.e. the slope of output signal 31 falls below a particular value again. According to this alternative example embodiment, the transition of the curve of output signal 31 from the relatively steep slope to an constant level (a point of inflection of the curve of output signal 31) during oxygen regeneration phase 33 may be detected.

The oxygen concentration in the exhaust gas after catalytic converter 12 decreases further towards the end of oxygen regeneration phase 33, which leads to a further increase in output signal 31 of exhaust-gas sensor 14. This increase in output signal 31 is ascertained in order to detect the end of oxygen regeneration phase 33. One may deduce that the oxygen regeneration phase has ended, when the gradient of output signal 31 of exhaust-gas sensor 14 exceeds a specifiable, third limiting value, i.e. when the curve of output signal 31 exceeds a certain slope. As an alternative, one may deduce that oxygen regeneration phase 33 has ended, when the gradient of output signal 31 of exhaust-gas sensor 14 initially exceeds a specifiable, third limiting value and then falls below a specifiable, fourth limiting value again.

Using the method of the present invention, the end of the nitrogen-oxide regeneration phase in a nitrogen-oxide storage catalyst 12' and the end of an oxygen regeneration phase 33 in a three-way catalyst may be ascertained safely and reliably and, above all, independently of fluctuations of output signal 31 of exhaust-gas sensor 14 caused by manufacturing tolerances or temperature fluctuations. In a catalytic converter 12 that is capable of storing both oxygen and nitrogen oxides, the end of nitrogen-oxide regeneration phase 32 may initially be determined, and the end of oxygen regeneration phase 33 may then be determined, by evaluating the gradient of output signal 31.

What is claimed is:

1. A method for operating a catalytic converter arranged in a location where the catalytic converter is exposable to an exhaust gas of an internal combustion engine, the method comprising:

controlling a composition of the exhaust gas in front of the catalytic converter by adding a reducing agent that promotes a regeneration of the catalytic converter;

measuring the composition of the exhaust gas via an exhaust-gas sensor arranged downstream from the catalytic converter, detecting a change in the composition of the exhaust gas after the catalytic converter; and evaluating a time lag between a start of the controlling of the composition of the exhaust gas and the detecting of the change in the composition of the exhaust gas by evaluating a gradient of an output signal of the exhaust-gas sensor;

wherein the catalytic converter includes at least one of a first catalyst capable of storing a nitrogen oxide and a second catalyst capable of storing oxygen, the at least one of the first catalyst and the second catalyst being judged to be regenerated when the gradient of the output signal of the exhaust-gas sensor initially exceeds a first limiting value and then falls below a second limiting value.

2. The method of claim 1, wherein the internal combustion engine is operated with a rich fuel/air mixture for addition of the reducing agent to the exhaust gas.

3. The method of claim 2, further comprising:
adding at least one of a hydrocarbon and carbon monoxide to the exhaust gas as the reducing agent.

4. The method of claim 1, further comprising:
adding urea to the exhaust gas as the reducing agent.

5. A control element for a control unit of an internal combustion engine of a motor vehicle, the control element comprising:
a memory for storing a computer program that is executable on a computing device, the computer program, when executed, involves a performance of:
controlling a composition of an exhaust gas in front of a catalytic converter by adding a reducing agent that promotes a regeneration of the catalytic converter;
measuring the composition of the exhaust gas via an exhaust-gas sensor arranged downstream from the catalytic converter, and
detecting a change in the composition of the exhaust gas;
evaluating a time lag between a start of the controlling of the composition of the exhaust gas and the detecting of the change in the composition of the exhaust gas by evaluating a gradient of an output signal of the exhaust-gas sensor;
wherein the catalytic converter includes at least one of a first catalyst capable of storing a nitrogen oxide and a second catalyst capable of storing oxygen, the at least one of the first catalyst and the second catalyst being judged to be regenerated when the gradient of the output signal of the exhaust-gas sensor initially exceeds a first limiting value and then falls below a second limiting value.

6. The control element of claim 5, wherein:
the memory includes one of a read-only memory and a flash memory, and
the computing device includes a microprocessor.

7. A control unit for an internal combustion engine including a catalytic converter arranged in a location where the catalytic converter is exposable to an exhaust gas of the internal combustion engine, the control unit comprising:
an arrangement for controlling a composition of the exhaust gas in front of the catalytic converter by adding a reducing agent that promotes a regeneration of the catalytic converter;
an arrangement for detecting a change in the composition of the exhaust gas after the catalytic converter by evaluating a gradient of an output signal of an exhaust-gas sensor arranged downstream from the catalytic converter; and
an arrangement for detecting a time delay between a start of the controlling of the composition of the exhaust gas and the change in the composition of the exhaust gas;
wherein the catalytic converter includes at least one of a first catalyst capable of storing a nitrogen oxide and a second catalyst capable of storing oxygen, and the control unit judges the at least one of the first catalyst and the second catalyst to be regenerated when the gradient of the output signal of the exhaust-gas sensor initially exceeds a first limiting value and then falls below a second limiting value.

8. An internal combustion engine, comprising:
a catalytic converter arranged in a location where the catalytic converter is exposable to an exhaust gas of the internal combustion engine;
an exhaust-gas sensor arranged downstream from the catalytic converter; and
a control unit including:
an arrangement for controlling a composition of the exhaust gas in front of the catalytic converter by adding a reducing agent that promotes a regeneration of the catalytic converter;
an arrangement for detecting a change in the composition of the exhaust gas after the catalytic converter by evaluating a gradient of an output signal of the exhaust-gas sensor; and
an arrangement for detecting a time delay between a start of the controlling of the composition of the exhaust gas and the change in the composition of the exhaust gas;
wherein the catalytic converter includes a first catalyst capable of storing a nitrogen oxide and a second catalyst capable of storing oxygen, and the control unit judges the at least one the first catalyst and the second catalyst to be regenerated when the gradient of the output signal of the exhaust-gas sensor initially exceeds a first limiting value and then falls below a second limiting value.

9. The internal combustion engine of claim 8, wherein the exhaust-gas sensor includes an oxygen-sensitive sensor.

10. The internal combustion engine of claim 8, wherein the exhaust-gas sensor includes a two-point sensor.

* * * * *